United States Patent
Dorak, Jr. et al.

(10) Patent No.: US 6,742,177 B1
(45) Date of Patent: May 25, 2004

(54) METHOD AND SYSTEM FOR SECURE DEBUGGING OF A SECURE SOFTWARE MODULE

(75) Inventors: John J. Dorak, Jr., Boca Raton, FL (US); Stephen B. Cagle, Coral Springs, FL (US); Richard L. Spagna, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/540,960

(22) Filed: Mar. 31, 2000

(51) Int. Cl.$^7$ ................................. G06F 9/44
(52) U.S. Cl. ..................................... 717/124
(58) Field of Search ................. 717/124–129; 713/200–201

(56) References Cited

U.S. PATENT DOCUMENTS

| | | | |
|---|---|---|---|
| 5,214,789 A | | 5/1993 | George |
| 5,778,304 A | | 7/1998 | Grube et al. |
| 5,812,850 A | * | 9/1998 | Wimble ........................ 717/131 |
| 5,819,093 A | * | 10/1998 | Davidson et al. ........... 717/126 |
| 5,956,038 A | | 9/1999 | Rekimoto |
| 5,990,886 A | | 11/1999 | Serdy et al. |
| 5,995,823 A | | 11/1999 | Stephens |
| 6,006,328 A | * | 12/1999 | Drake ........................ 713/200 |
| 6,042,614 A | * | 3/2000 | Davidson et al. ........... 717/116 |
| 6,067,641 A | * | 5/2000 | McInerney et al. ........... 714/38 |
| 6,122,658 A | | 9/2000 | Chaddha |
| 6,154,172 A | | 11/2000 | Piccionelli et al. |
| 6,158,045 A | * | 12/2000 | You ........................... 717/124 |
| 6,343,280 B2 | * | 1/2002 | Clark ........................... 705/55 |
| 6,385,727 B1 | * | 5/2002 | Cassagnol et al. .......... 713/193 |
| 6,516,408 B1 | * | 2/2003 | Abiko et al. ................ 712/227 |

OTHER PUBLICATIONS

Kirby et al. SCR: A Practical Approach to Building a High Assurance COMSEC System. IEEE. pp. 109–118. 1999.*
Spinellis. Reflection as a Mechanism for Software Integrity Verification. ACM. 2000. pp. 51–62.*

* cited by examiner

*Primary Examiner*—Wei Zhen
(74) *Attorney, Agent, or Firm*—David M. Shofi; Jon A. Gibbons; Gutman, Bongini & Bianco P.L.

(57) ABSTRACT

A method to debug application interface calls made to a tamper-resistant software module. The method comprises the steps of: loading a first application to be debugged using a debugging application, wherein the application makes one or more function calls to a tamper-resistant software module. A debugger application for symbolically debugging the first application is run and the debugger application with an initialization file that performs the steps of: loading a client application running a client socket service; loading a server application running a server socket service; loading the tamper-resistant software module with one or more function calls made thereto by the first application. The client application translates the one or more function calls made to the tamper-resistant software module during the running of the debugger application into socket calls and returns any status received from the socket calls to the first application. The server application translates the one or more function calls made to the tamper-resistant software module that are received via socket calls from the client application into function calls into the tamper-resistance software module and returning any status received back from the function calls into socket calls for receipt for the server application.

In an alternate embodiment, a computer readable medium and system is disclosed that corresponds to the method above.

16 Claims, 4 Drawing Sheets

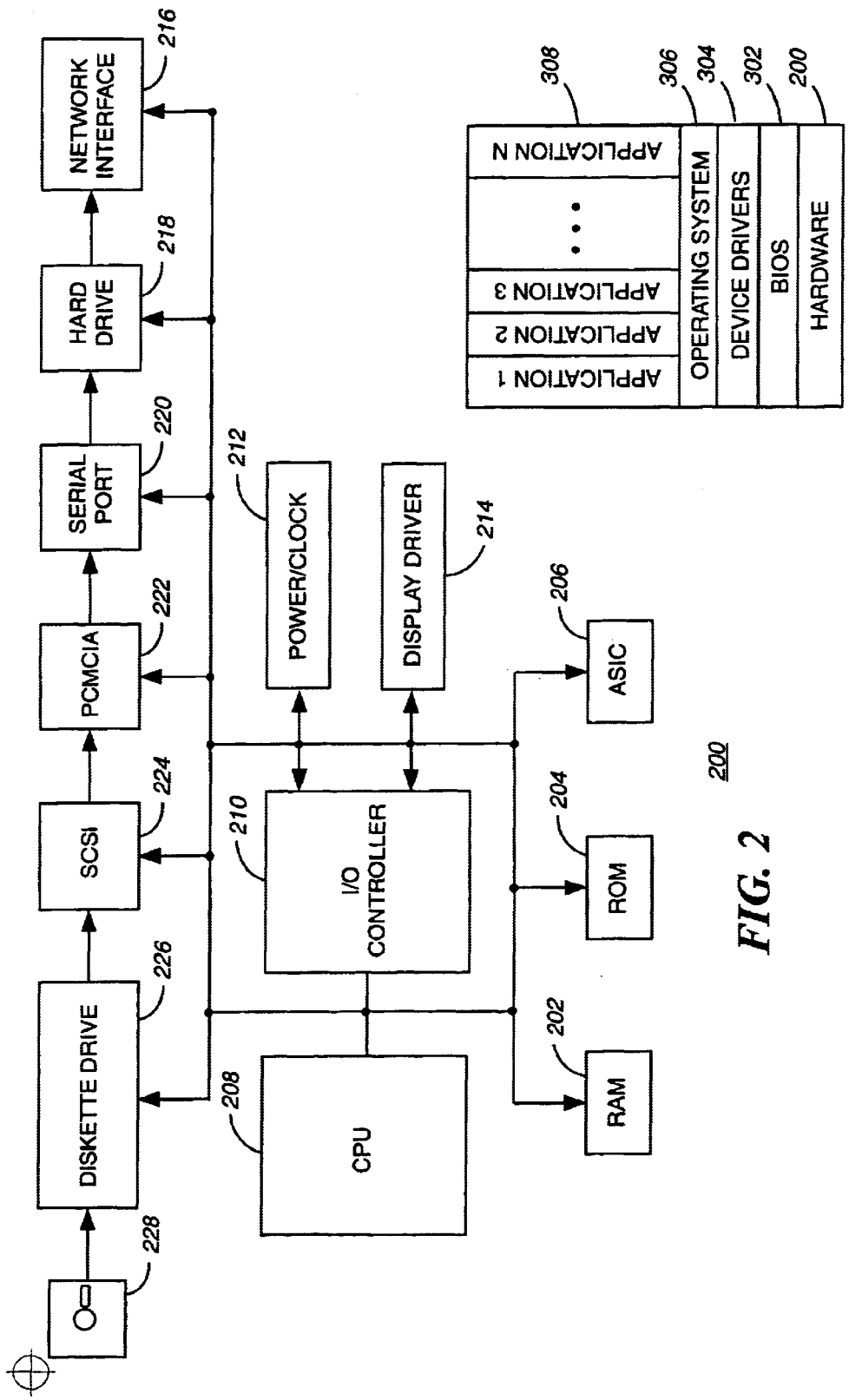
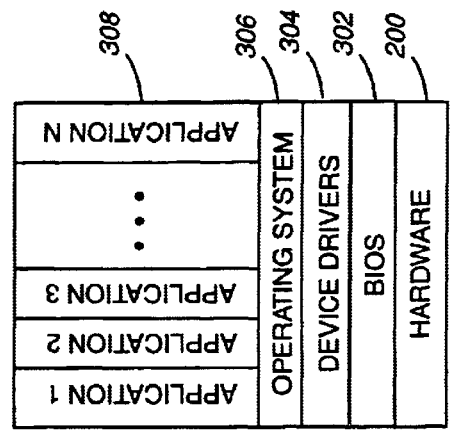

METHOD AND SYSTEM FOR SECURE DEBUGGING OF A SECURE SOFTWARE MODULE

CROSS-REFERENCE TO RELATED APPLICATIONS

Not Applicable

BACKGROUND OF THE INVENTION

1. Field of the Invention

Broadly this invention relates to software and programming and more particularly relates to the field of using commercial debuggers for tamper-resistant software modules.

2. Description of the Related Art

Programs or the sequences of instructions suitable for processing for computer hardware continue to grow larger and become more complicated. Advancements in both processor speeds and storage capacity have almost doubled every two years. Most programs are written in human readable formats using a text editor. Examples of programming languages include C/C++, Fortran, Basic, Ada, Cobol, Basic, Pascal and assemblers. Source code is compiled into object code, sometimes referred to the "before" and "after" versions of a computer program. The object code file contains a sequence of instructions that the processor can understand but that is difficult for a human to read or modify. For this reason and because even debugged programs often need some later enhancement, the source code is the most permanent form of the program.

A text editor is a computer programs that lets a user enter, change, store, and usually print text. Text editors can be used to enter program language source code. Typically, a text editor provides an "empty" display screen (or "scrollable page") with a fixed-line length and visible line numbers. A developer can then fill the lines in with text, line by line. Special command line lets you move to a new page, scroll forward or backward, make global changes in the program, save the program, and perform other actions. After saving a program, the developer can then print it or display it. Before printing or displaying it, you may be able to format it for some specific output device or class of output device. A popular text editor in IBM's large or mainframe computers is called XEDIT. In UNIX systems, the two most commonly used text editors are Emacs and vi. In personal computer systems, wordprocessors are more common than text editors. However, there are variations of mainframe and UNIX text editors that are provided for use on personal computers. An example is KEDIT, which is basically XEDIT for Windows.

Once the source code is written with a text editor, the source code is compiled into object code. In some system the object code is linked to a relocatable address space with other object modules.

Almost without exception, most very early version of programs has errors or "bugs" and the developer is faced with the task of debugging. The process of debugging starts with the locating and fixing or bypassing bugs (errors) in computer program code or the engineering. To debug a program is to start with a problem, isolate the source of the problem, and then fix it. A developer of a program that does not know how to fix the problem may learn enough about the problem to be able to avoid it until it is permanently fixed. When someone says they've debugged a program or "worked the bugs out" of a program, they imply that they fixed it so that the bugs no longer exist.

Debugging is a necessary process in almost any new software or hardware development process, whether a commercial product or an enterprise or personal application program. For complex products, debugging is done as the result of the unit test for the smallest unit of a system, again at component test when parts are brought together, again at system test when the product is used with other existing products, and again during customer beta testing, when users try the product out in a real world situation. Because most computer programs and many programmed hardware devices contain thousands of lines of code, almost any new product is likely to contain a few bugs. Invariably, the bugs in the functions that get most use are found and fixed first. An early version of a program that has lots of bugs is referred to as "buggy."

Debugging tools help identify coding errors at various development stages. FIG. 1 is a block diagram of at software development GUI 108 with an application in both source 106 and object 102 form running on a computer hardware platform 102. Some programming language packages include a facility for checking the code for errors as it is being written. A class of symbolic debuggers such as Microsoft Visual C++, IBM's Visual Age, Delphi Compilers and other debuggers exist that enable developer to step through their source code as the code is being executed. Developers can watch variables, set breakpoints and modify the contents of processor registers.

There exists a class of programs that are caller "secure" or "tamper-resistant." A tamper resistant program module is a module which is written in an environment to deter the unauthorized access to program module. Such "tamper-resistant" modules are used where sensitive steps are performed during programming execution. One example of the use of "tamper-resistant" programs is the decoding of security keys in a private-public key or symmetric key environment or the processing of any sensitive information such as financial information.

Tamper-resistant software technology is a method to deter unauthorized entry into a computer software application by a hacker. Typically a hacker wants to understand and/or modify the software to remove the restrictions on the usage. In practicality, no computer program exists that cannot be hacked; that is why tamper-resistant software is not called "tamper-proof." But the amount of effort required to hack a tamper-resistance protected application usually deters most hackers because the effort is not worth the possible gain.

One type of tamper-resistant software technology is from IBM. One product this code was introduced is in the IBM think pad model 770 laptop computer. Here, the tamper-resistant software was used to protect the DVD movie player in the computer. Digital Content Provider(s) such as Hollywood studios, concerned about the advent of digital movies and the ease at which perfect copies can be made, have insisted that movies on DVD disc(s) contain copy protection mechanisms. IBM's tamper-resistant software made it difficult to circumvent these copy protection mechanisms. This is a very typical application for tamper-resistant software; the software is used to enforce rules on the usage of some protected type of sensitive information content.

IBM's tamper-resistant software puts several types of obstacles in the path of the attacker. First, it contains techniques to defeat, or at least reduce the effectiveness of, the standard software tools that the hacker uses: debuggers and dissasemblers. Second it contains self-integrity checking, so that single modifications, or even small handfuls of modifications, will be detected and cause incorrect operation. Finally, it contains obfuscating to mislead hackers regarding its true operation. The latter technique is largely ad hoc, but the first two build upon well-known tools in cryptography: encryption and digital signatures.

The use of tamper-resistant software although very useful, makes the use of debugging tools nonfunctional in finding errors in applications that call tamper-resistant modules. The debugging of applications that call tamper-resistance modules without the use of symbolic debuggers is extremely difficult. Accordingly, a need exists for a method to enable developers of applications that use tamper-resistant applications to step through API calls to tamper-resistant modules from a calling program and receive any status sent that are sent back from the API to the debugger.

SUMMARY OF THE INVENTION

According to one aspect of the invention, a method to debug application interface calls made to a tamper-resistant software module is disclosed. The method includes using a client-server socket connection to communicate through an intermediate software module with an intermediate function call. An application being symbolically debugged with a function call into the tamper-resistant software module is handled by the intermediate software module so that the intermediate function call returns through to the client-server socket connection any status from the function call in the tamper-resistant software module. The present invention works with any programming code written for a tamper-resistant environment where the provider of the tamper-resistant environment does not provide access to the function call in the tamper-resistant environment and does not allow the user provided code to execute within the tamper-resistant environment. Further, the present invention enables a software developer to understand the program flow of his/her application by running the symbolic debugger. When the application is not being debugged the client-server socket connection and the intermediate code is not loaded and the call to a function into the tamper-resistant module from the application is handled directly.

In an alternate embodiment, a computer readable medium and system is disclosed that corresponds to the method above.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 2 is a block diagram of the major electrical components of the computer hardware platform of FIG. 1, according to the present invention.

FIG. 3 is a block diagram illustrating the software hierarchy for the information processing device of FIG. 2, according to the present invention.

DETAILED DESCRIPTION OF THE PREFERRED EMBODIMENTS

Figure 1:
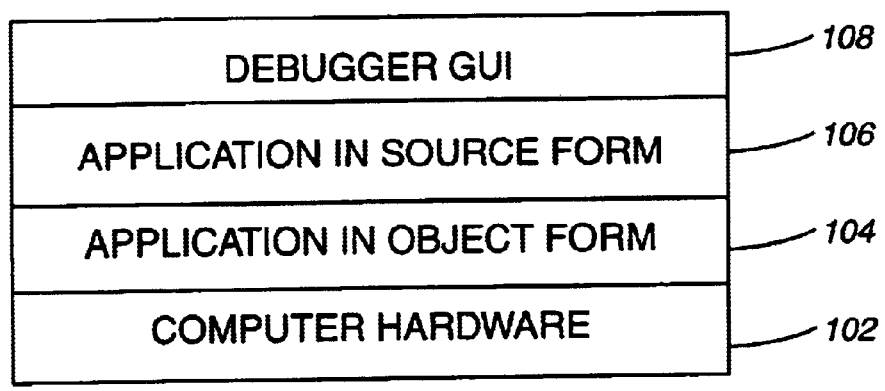
FIG. 1 is a block diagram of a prior art software development GUI with an application in both source and object form running on a computer hardware platform.

However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Glossary of Terms

API (Application Programming Interface)—is the specific method prescribed by a computer operating system or by another application program by which a programmer writing an application program can make requests of the operating system or another application. An API can be contrasted with a graphical user interface or a command interface (both of which are direct user interfaces) as interfaces to an operating system or a program.

Breakpoints—points to stop execution of a program during debugging as specified by the user of a debugger.

Client/server—Client/server describes the relationship between two computer programs in which one program, the client, makes a service request from another program, the server, which fulfills the request. The client/server relationship can be used by programs within a single computer, or between two programs across a network.

Debugging—the process of locating and fixing or bypassing bugs (errors) in computer program code or the engineering.

Header File—synonymous with include file. A text file that contains declaration used by a group of functions, program, or user. Usually a header may be a file that precedes the main file constitute and describes the characteristics, declarations and function calls of the main file.

Object Code—Source code and object code refer to the "before" and "after" versions of a computer program that is compiled before it is ready to run in a computer. The object code file contains a sequence of instructions that the processor can understand but that is difficult for a human to read or modify. For this reason and because even debugged programs often need some later enhancement, the source code is the most permanent form of the program.

Server—a server is a computer program that provides services to other computer programs in the same or other computers. In the client/server programming model, a server is a program that awaits and fulfills requests from client programs in the same or other computers. A given application in a computer may function as a client with requests for services from other programs and a server of requests from other programs.

Sockets—is a method for communication between a client program and a server program. A socket connect may be used over a network between two computers or between two programs running on one computer.

Source Code—The source code consists of the programming statements that are created by a programmer with a text editor or a visual programming tool and then saved in a file. For example, a programmer using the C language types in a desired sequence of C language statements using a text editor and then saves them as a named file. This file is said to contain the source code.

Symbolic Debugger—is a software tool normally used to debug application programs. It should be possible to use it either to examine core images when a program aborts, or to provide a controlled environment for the execution of a program.

Text Editor—A text editor is a computer program that lets a user enter, change, store, and usually print text (characters and numbers, each encoded by the computer and its input and output devices, arranged to have meaning to users or to other programs).

Tamper Resistant Code—software technology is a method to deter unauthorized entry into a computer software application by a hacker.

Exemplary Computer Hardware

Referring to FIG. 2, there is shown a block diagram of the major electrical components of the computer hardware 102 in accordance with this invention. The electrical components include: a central processing unit (CPU) 208, an Input/Output (I/O) Controller 210, a system power and clock source 212; display driver 214; RAM 202; ROM 204; ASIC (application specific integrated circuit) 206 and a hard disk drive 218. These are representative components of a computer. The operation of a computer comprising these elements is well understood. Network interface 216 provides connection to a computer network such as Ethernet, TCP/IP or other popular protocol network interfaces. Optional components for interfacing to external peripherals include: a Small Computer Systems Interface (SCSI) port 224 for attaching peripherals; a PCMCIA slot 2224; and serial port 220. An optional diskette drive 226 is shown for loading or saving code to removable diskettes 228 or equivalent computer readable media.

The system 200 may be implemented by combination of hardware and software. Moreover, the functionality required for using the invention may be embodied in computer-readable media such as a floppy diskette, CD ROM, DVD ROM, Flash Memory or other removable computer readable medium to be used in programming an information-processing apparatus (e.g., a personal computer) to perform in accordance with the invention. Computer program means or computer program in the present context mean any expression, in any language, code or notation, of set of instructions intended to cause a system having an information processing capability to perform a particular function either directly or after either or both of the following: i) conversions to another language, code or notation; ii) reproduction in a different material form.

FIG. 3 is a block diagram illustrating the software hierarchy for the information processing device of FIG. 2, according to the present invention. The hardware 200 is the information processing system of FIG. 2. BIOS (Basic Input Output System) 302 is a set of low level of computer hardware instructions, usually stored in ROM 206, for communications between an operating system 306, device driver(s) 304 and hardware 200. Device drivers 304 are hardware specific code used to communicate between and operating system 306 and hardware peripherals such as a mouse, CD ROM drive or printer. Applications 308 are software application written in C/C++, Java, assembler or equivalent. Operating system 306 is the master program that loads after BIOS 302 initializes, that controls and runs the hardware 200. Examples of operating systems include DOS, Windows 3.1/95/98/NT, Linux, Unix, Macintosh, OS/2 and equivalent. In one embodiment, the application 308 that resides on the Database Server 106 and communicates with client 108 over the network 116.

The present invention can be realized in hardware, software, or a combination of hardware and software. The application 308 according to the present invention can be realized in a centralized fashion in one computer, or in a distributed fashion where different elements are spread across interconnected computer systems. Any kind of computer system—other apparatus adapted for carrying out the method described herein is suited. A typical combination of hardware and software could be a general purpose computer system such that it carries out the methods described herein. The present invention can also be embedded in a computer program product, which comprises all the features enabling the implementation of the methods described herein, and which—when loaded in a computer system—is able to carry out these methods.

Exemplary Software Development with Debugging a Tamper-Resistant Module

Figure 4:
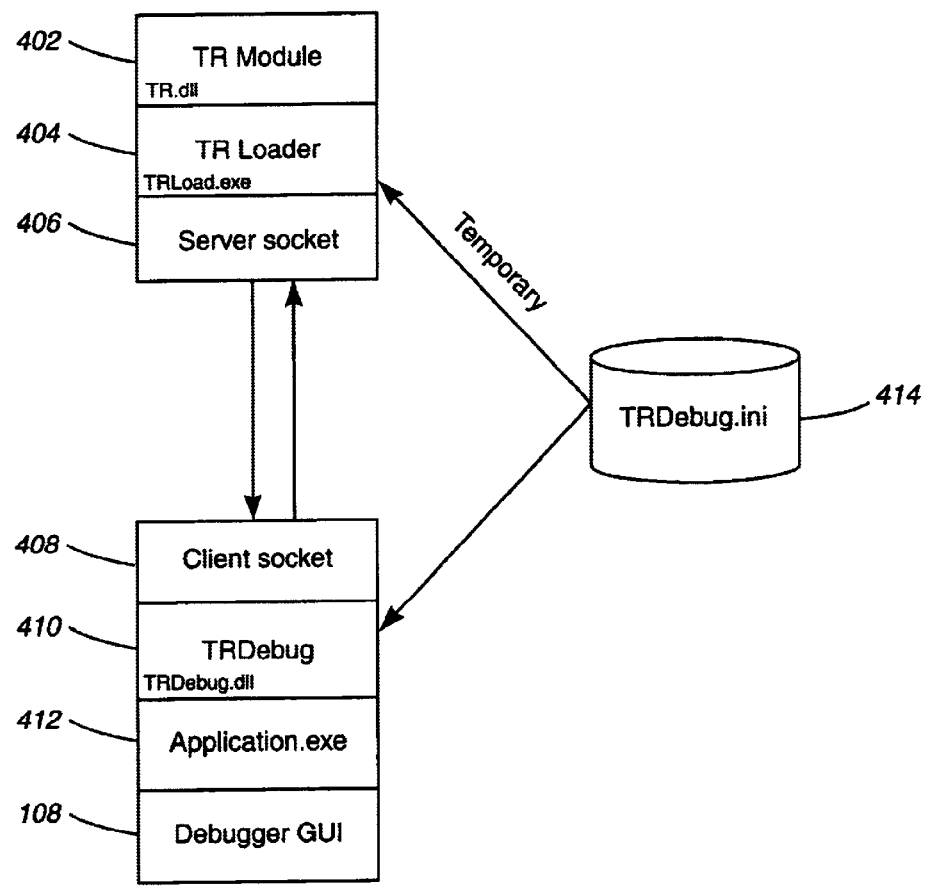
FIG. 4 is a block diagram illustrating the software debugger GUI with an application using a socket connection back to the toolkit, according to the present invention.

FIG. 4 is a block diagram illustrating the software debugger GUI 108 with an application using a socket connection back to the toolkit, according to the present invention. The TR.DLL 402 is the tamper resistant module which is called by the Application.exe 412. Upon startup of the debugger GUI 108, an initialization file TRDebug.ini 414 is used to set the default for the socket connection and other user specific information in conjunction with the TRLoad.exe 404 module. In another embodiment, the TRDebug.ini 414 file is replaced by entries to the registry and in this embodiment, the TRLoad.exe 404 module checks the registry entries. A server socket layer 406 communicated with a client socket layer 408. A debugging GUI 108 uses the necessary source files of the Application.exe such as the .H, .C, and .DLL files for necessary as required by the debugger.

Although this diagram illustrates the target tamper resistant module as a DLL and the Application.exe as both a DLL and a linked EXE application, to those skilled in the art of programming, other possible programming architecture are possible which permit applications to debug tamper-resistant portions using sockets.

Figure 5:
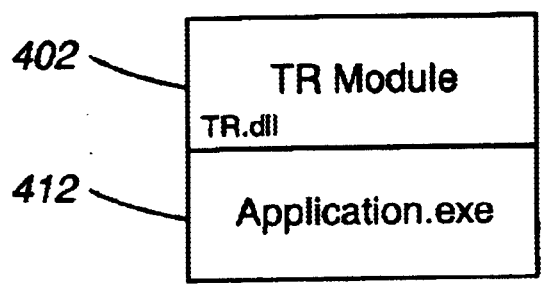
FIG. 5 is a block diagram illustrating the application that is shipped with the tamper-resistant application of FIG. 4, without the debugging modules according to the present invention.

FIG. 5 is a block diagram illustrating the application that is shipped with the tamper-resistant application of FIG. 4, without the debugging modules according to the present invention. Note that the shipped application 404 does not depend on the socket connections 408 and 410 for communications to the TR.DLL 402 and instead relies on a direct connection.

Exemplary Socket Connection

As defined above sockets 406 and 408 are a method for communication between a client program and a server program. A socket connect may be used over a network between two computers or between two programs running on one computer. A socket is defined as "the endpoint in a connection." Sockets are created and used with a set of programming requests or "function calls" sometimes called the sockets application programming interface (API). The most common sockets API is the Berkeley UNIX C language interface for sockets. Sockets can also be used for communication between processes within the same computer. This is the typical sequence of sockets requests from a server application in the "connectionless" context of the Internet in which a server handles many client requests and does not maintain a connection longer than the serving of the immediate request. A server sequence of sockets requests:

socket( )
|
bind( )
|
recvfrom( )
|
(wait for a sendto request from some client)
|
(process the sendto request)
| sendto (in reply to the request from the client . . . for example, send an HTML file)

A corresponding client sequence of sockets requests would be:

socket( )
|
bind( )
|
sendto
|
recvfrom( )

In one embodiment, the Microsoft® Windows® Sockets 2 is used. The Windows Sockets 2 uses the sockets paradigm that was first popularized by Berkeley Software Distribution (BSD) UNIX. It was later adapted for Microsoft® Windows® in Windows Sockets 1.1 for developers using C/C++.

Exemplary Application Client Socket Connection 410
////////////////////////////////////////////////////////////////////
// Application Side of Debug environment
////////////////////////////////////////////////////////////////////

```
//
// TRFunction1 from TRDebug.dll
// Application GUI calls this routine which in turn sends a
    message to TRLoad.exe via socket interface.
//
//-----------------------------------------------------------------
---------
__declspec(dllexport) LONG TRFunction1 (PSZ
    Parameter1)
{
    int rlen;
    char msg[BUFF_SIZE];
    sprintf(msg,"TRFunction1,%s",Parameter1);
    len=strlen(msg);
    rlen=SockSendMessage(msg,len);
    msg[rlen+1]=0;
    return (atol(msg));
}

//
// TRDebug.dll listens for return codes on socket and returns
    results received from TRLoad.exe
// via socket interface to the application
//
Exemplary Application Sever Socket Connection 408
////////////////////////////////////////////////////////////////////
// Tamper Resistant Side of Debug environment
////////////////////////////////////////////////////////////////////

//
// TRLoad.exe receives message from socket and checks text
    string to call Tamper Resistant function
// via an intermediate function
//
//-----------------------------------------------------------------
------------
    LONG rc;
{
    .
    .
    .
//---------------------------------------------------------
// TRFunction1
//---------------------------------------------------------
if((strcmp(param[1],"TRFunction1"))==0)
{
    rc=Intermediate_TRFunction1(szBuf,&rmlen);
```

```
    break;
}

// Send reply back to TRDebug.dll
rc=send(remoteSocket,szBuf,rmlen,0);
}
//
// This intermediate function calls in TRLoad.exe calls the
    actual
// Tamper Resistant function which then returns to the
    calling function for
// sending back the return code to TRDebug.dll via the
    socket interface
//
//-----------------------------------------------------------------
---------
__declspec(dllexport) LONG (Intermediate_TRFunction1
    (PSZ szBuf, int *rmlen)
{
    char TempStr[MAX_PATH];
    LONG rc;
    rc=TRFunction1(Paramter1);
    ltoa(rc, TempStr, 10);
    sprintf(szBuf,TempStr);
    *rmlen=strlen(szBuf);
}
```

By using the socket layer connections above a developer using a symbolic debugger, i.e., debugger GUI 108, can step through each instruction in the application 412 including the API calls made from the Application.exe 412 to the TR Module 402 with any status from the API returned to the debugger. Accordingly, a developer can understand the program flow of their application by running a symbolic debugger.

Although the application of the invention has been discussed with reference to the figures, the invention should not be construed as limited thereto, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for a symbolic debugger to debug a software program making one or more function calls to a tamper-resistant software module, the method comprising the steps of:

loading a tamper-resistant software module comprising at least one function call, wherein programming code to implement the at least one function call is not made available for debug;

loading an intermediate software module which includes an intermediate function call from a server socket interface to the at least one function call in the tamper-resistant software module, wherein the intermediate function call returns through to the server socket interface any status from the at least one function call in the tamper-resistant software module;

executing a socket client interface service performing the steps of:

a) receiving a call to the least one function call in the tamper-resistant software module from a software program being debugged by a symbolic debugger;

b) translating the function call received into a socket call;

c) returning any status received from the socket call to software program being debugged;

executing the socket server interface service performing the steps of:

a) receiving one or more socket calls from a client socket service;

b) translating the socket calls received into the at least one function call for execution in the tamper-resistant software module; and c) returning any status from the execution of the at least one function call.

wherein the intermediate software module provides an executable return to a software program being debugged by a symbolic debugger into the at least one function call in the tamper resistant software module.

2. The method according to claim 1, further comprising the steps of:

loading a software program being debugged by a symbolic debugger; and executing the symbolic debugger, wherein any function calls to the tamper-resistant software module are return with status to the symbolic debugger from the socket client.

3. The method according to claim 2, wherein the step of executing a socket client interface includes executing a socket client interface as part of a debug module that is loaded by the symbolic debugger.

4. The method according to claim 3, wherein the step of executing a socket client interface includes executing a socket client interface as part of a debug module that is loaded by the symbolic debugger as directed by an initialization file.

5. The method according to claim 2, wherein the step of executing a socket server interface includes executing a socket client interface as part of a debug module that is loaded by the symbolic debugger.

6. The method according to claim 5, wherein the step of executing a socket server interface includes executing a socket client interface as part of a debug module that is loaded by the symbolic debugger as directed by an initialization file.

7. A method to debug application interface calls made to a tamper-resistant software module comprising the steps of:

loading a first application to be debugged using a debugging application, wherein the application makes one or more function calls to a tamper-resistant software module;

running a debugger application for symbolically debugging the first application;

supplying the debugger application with an initialization file that performs the steps of:

loading a client application running a client socket service;

loading a server application running a server socket service;

loading the tamper-resistant software module with one or more function calls made thereto by the first application, wherein programming code to implement the function calls is not made available for debug;

loading an intermediate software module which includes an intermediate function call from the server socket service to the function calls in the tamper-resistant software module, wherein the intermediate function call returns through to the server socket service any status from the function calls in the tamper-resistant software module;

wherein the client application translates the one or more function calls made to the tamper-resistant software module during the running of the debugger application into socket calls and returns any status received from the socket calls to the first application;

wherein the server application translates the one or more function calls made to the tamper-resistant software module that are received via socket calls from the client application into function calls into the tamper-resistance software module and returning any status received back from the function calls into socket calls for receipt for the server application; and wherein the intermediate software module provides an executable return to the first application being debugged by the symbolic debugger into the function calls in the tamper resistant software module.

8. A computer readable medium containing programming instructions for a symbolic debugger to debug a software program making one or more function calls to a tamper-resistant software module, the programming instructions comprising:

loading a tamper-resistant software module comprising at least one function call, wherein programming code to implement the at least one function call is not made available for debug;

loading an intermediate software module which includes an intermediate function call from a server socket interface to the at least one function call in the tamper-resistant software module, wherein the intermediate function call returns through to the server socket interface any status from the at least one function call in the tamper-resistant software module;

executing a socket client interface service performing the programming instructions of:

a) receiving a call to the least one function call in the tamper-resistant software module from a software program being debugged by a symbolic debugger;

b) translating the function call received into a socket call;

c) returning any status received from the socket call to software program being debugged;

executing a socket server interface service performing the instructions of:

b) receiving one or more socket calls from a client socket service;

c) translating the socket calls received into the at least one function call for execution in the tamper-resistant software module; and d) returning any status from the execution of the at least one function call wherein the intermediate software module provides an executable return to a software program being debugged by a symbolic debugger into the at least one function call in the tamper resistant software module.

9. The computer readable medium according to claim 8, further comprising the programming instructions of:

loading a software program being debugged by a symbolic debugger; and executing the symbolic debugger, wherein any function calls to the tamper-resistant software module are return with status to the symbolic debugger from the socket client.

10. The computer readable medium according to claim 9, wherein the programming instruction of executing a socket client interface includes executing a socket client interface as part of a debug module that is loaded by the symbolic debugger.

11. The computer readable medium according to claim 10, wherein the programming instruction of executing a socket client interface includes executing a socket client interface as part of a debug module that is loaded by the symbolic debugger as directed by an initialization file.

12. The computer readable medium according to claim 9, wherein the programming instruction of executing a socket server interface includes executing a socket client interface as part of a debug module that is loaded by the symbolic debugger.

13. The computer readable medium according to claim 9, wherein the programming instruction of executing a socket server interface includes executing a socket client interface as part of a debug module that is loaded by the symbolic debugger as directed by an initialization file.

14. A computer readable medium containing programming instructions to debug application interface calls made to a tamper-resistant software module comprising the programming instructions of:

loading a first application to be debugged using a debugging application, wherein the application makes one or more function calls to a tamper-resistant software module;

running a debugger application for symbolically debugging the first application;

supplying the debugger application with an initialization file that performs the programming instructions of:
   loading a client application running a client socket service;
   loading a server application running a server socket service;
   loading the tamper-resistant software module with one or more function calls made thereto by the first application wherein graming code to implement the function calls is not made available for debug;

loading an intermediate software module which includes an intermediate function call from the server socket service to the function calls in the tamper-resistant software module, wherein the intermediate function call returns through to the server socket service any status from the function calls in the tamper-resistant software module;

wherein the client application translates the one or more function calls made to the tamper-resistant software module during the running of the debugger application into socket calls and returns any status received from the socket calls to the first application;

wherein the server application translates the one or more function calls made to the tamper-resistant software module that are received via socket calls from the client application into function calls into the tamper-resistance software module and returning any status received back from the function calls into socket calls for receipt for the server application; and wherein the intermediate software module provides an executable return to the first application being debugged by the symbolic debugger into the function calls in the tamper resistant software module.

15. An information processing system comprising:

a first application to be debugged using a debugging application, wherein the application makes one or more function calls to a tamper-resistant software module;

a debugger application for symbolically debugging the first application;

an initialization file supplied to the debugger application comprising:
   means for loading a client application running a client socket service;
   means for loading a server application running a server socket service;
   means for loading the tamper-resistant software module with one or more function calls made thereto by the first application, wherein programming code to implement the function calls is not made available for debug;

wherein the client application translates the one or more function calls made to the tamper-resistant software module during the running of the debugger application into socket calls and returns any status received from the socket calls to the first application;

wherein the server application translates the one or more function calls made to the tamper-resistant software module that are received via socket calls from the client application into function calls into the tamper-resistance software module and returning any status received back from the function calls into socket calls for receipt for the server application; and wherein the intermediate software module provides an executable return to the first application being debugged by the symbolic debugger into the function calls in the tamper resistant software module.

16. The information processing system according to claim 15, wherein the tamper-resistant software module is a software module used to decrypt multimedia data that has been previously encrypted.

* * * * *